United States Patent

[11] 3,569,833

[72] Inventor Robert T. Milton
Burnt Hills, N.Y.
[21] Appl. No. 785,636
[22] Filed Dec. 20, 1968
[45] Patented Mar. 9, 1971
[73] Assignee General Electric Company

[54] RESONANT RING COUPLING COMMUNICATIONS SYSTEM
8 Claims, 4 Drawing Figs.

[52] U.S. Cl. .......... 325/26, 325/51, 340/195
[51] Int. Cl. .......... H04b 5/00, H04b 3/60
[50] Field of Search .......... 325/15, 26, 125, 51, 4, 66, 113; 340/177, 195, (Inquired); 333/10 (Inquired)

[56] References Cited
UNITED STATES PATENTS

| | | | |
|---|---|---|---|
| 3,189,855 | 6/1965 | Forrer | 333/10X |
| 3,203,506 | 8/1965 | Cummins | 179/82 |
| 3,246,308 | 4/1966 | Matthews, Jr. | 340/177 |
| 3,268,880 | 8/1966 | Miller | 340/195X |
| 3,310,736 | 3/1967 | Bayly et al. | 179/82X |

*Primary Examiner*—Robert L. Griffin
*Assistant Examiner*—Benedict V. Safourek
*Attorneys*—Paul A. Frank, John F. Ahern, Louis A. Moucha, Frank L. Neuhauser and Oscar B. Waddell

ABSTRACT: A waveguide loop having a circumference approximately an integer multiple of a wavelength at the signal-operating frequency and a directional coupler spaced-apart from the waveguide loop are utilized to effectuate power coupling without significant signal loss between a transmitter and a receiver in relative motion with respect to each other.

INVENTOR:
ROBERT T. MILTON
by Paul A. Frank
HIS ATTORNEY

RESONANT RING COUPLING COMMUNICATIONS SYSTEM

This invention relates to an apparatus for coupling signals without significant signal variance between a receiver and transmitter having relative motions with respect to each other, and, more particularly, to an apparatus having a resonant ring to which are coupled signals transmitted by a transmitter secured to a high speed, rotating structure and from which, by means of a second coupler, the signals are received by a receiver mounted exteriorly of said rotating structure.

In telemetry systems used inside rotating machinery, signal coupling is ordinarily effectuated by causing radiation to emanate from a short transmitter antenna to a receiving antenna consisting of a wire placed in the general vicinity of the transmitter. Telemetry systems have also been utilized in the measurements of operations, temperature changes, stress, and the like, which occur in rotating machinery. Telemetry of information suffers, however, from serious drawbacks due to variation of the transmitted signal because of blocking and interference effects. A relative motion between the transmitter and the receiver and/or conducting or reflecting objects intermittently coming between the transmitter and the receiver cause the signal transmitted to fade and, at times, disappear at the receiver. Slip rings and bushes have been used to achieve constant, efficient coupling. This technique of preventing signal variation has not proven to be entirely satisfactory due to the inherent friction between stationary and moving parts and subsequent wear.

A primary object of my present invention, therefore, is to provide for apparatus which prevents significant variation in telemetry signals received from a transmitter moving relative to the receiver.

Another important object of my present invention is to provide for an apparatus which effectuates almost complete power transfer of signals between a transmitter and a receiver, one of which may be secured to a rotating object without the use of slip rings and the like.

In accordance with one embodiment of my present invention, a transmitter is secured to a rotating object and transmits a signal-carrying telemetry information initially received from a detecting sensor. The signal is coupled to a resonant waveguide loop by a directional coupler stationary with respect to the transmitter and spaced apart from the waveguide loop. The circumference of the waveguide loop is preselected to be an integer multiple of the wavelength of the signal transmitted by the transmitter. A wave is induced within the waveguide, circulates in a predetermined direction therein as determined by the directional coupler, is amplified due to the resonant characteristics of the circular waveguide loop, and is coupled out of the loop by a second coupler spaced-apart from the waveguide. The signal then proceeds to a receiver where the telemetry information carried by the signal may be interpreted or measured by appropriate devices.

The features of the invention believed to be novel are set forth with particularity in the appended claims. The invention itself, however, together with further objects and advantages thereof, may be best understood by reference to the following description taken in conjunction with the accompanying drawings wherein:

Figure 1:
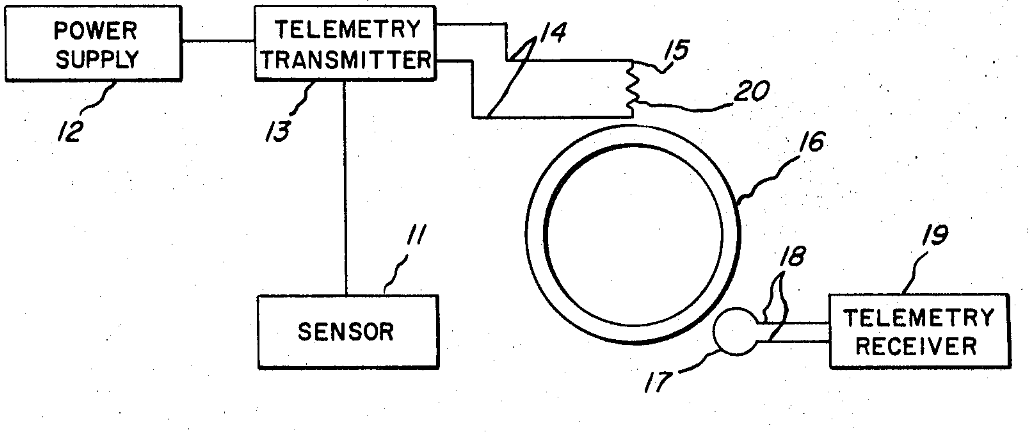
FIG. 1 is a simple electrical schematic diagram of one embodiment of my present invention.

FIG. 1 illustrates a simple electrical schematic of one embodiment of my invention wherein sensor 11 and power supply 12 are connected to a telemetry transmitter 13. Output conductors 14 lead from transmitter 13 to directional coupler 15 which is coupled to a closed-loop, two line waveguide 16. An output coupler 17 couples waveguide 16 to input conductors 18 leading to receiver 19.

Sensor 11 may be utilized to measure temperature fluctuations, vibrations, stress, or the like, within a high speed rotating body such as a steam turbine shaft. The signal originated by sensor 11 is conducted to transmitter 13 for amplification, modulation on a carrier, and transmission. Power supply 12 may consist of a plurality of batteries and supplies DC power sufficient to energize the circuits of transmitter 13.

Directional coupler 15 is depicted as having a resistor 20 which is selected with a predetermined value to waveguide 16 to cancel in one direction around waveguide loop 16. Such cancellation is necessary in order to preclude inducement of two comparable amplitude oppositely moving waves within waveguide loop 16. Two oppositely moving waves superimpose to form a standing wave and when the waves are of comparable amplitude significant amplitude variations occur in the signal received by receiver 13. Output coupler 17 need be only a simple loop conductor which samples the magnetic field generated by the travelling wave within loop 16 or it may be a probe to sample the electric field. Alternatively, output coupler 17 may be directional while coupler 15 may be a loop coupler. The final result is still the same, however. In this latter case, two oppositely moving waves are induced within waveguide 16, but output coupler 17 being directional is responsive only to a wave moving in one preselected direction about waveguide 16. Thus receiver 19 still receives a signal induced by a wave moving in the preselected direction. It should also be understood that other couplers which satisfactorily fulfill the purposes intended may be employed in lieu of the above when desired.

The circumference of waveguide loop 16 is a function of the wavelength of the signal transmitted by transmitter 13. Thus, by making the circumference of waveguide loop 16 equal to approximately an integer multiple of the wavelength of the signal, waveguide loop 16 is resonant to the signal. That is, the original signal applied to input directional coupler 15 is reinforced each time the induced wave passes directional coupler 15. The amplitude buildup continues until the circulating signal losses equal the power available from transmitter 13. At a transmitting frequency of 100 MHz, a waveguide loop circumference of approximately 3 meters is sufficient to cause resonance at this frequency.

Figure 2:
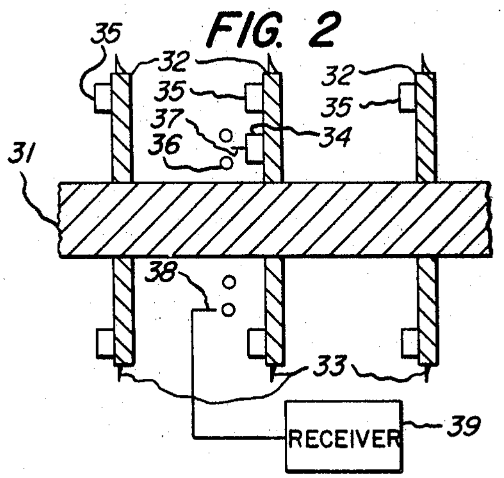
FIG. 2 is a simple cross-sectional view of one embodiment of my present invention illustrating a telemetry transmitter thereof attached to a rotating structure.

FIG. 2 illustrates in cross-sectional view a high speed rotating shaft 31 of an apparatus such as a steam turbine. Attached to and circumscribing the shaft 31 are a plurality of wheels 32. Blades 33 are fixed to the outer periphery of wheels 32. A transmitter 34 is attached to one of the wheels 32 below a corresponding balancing weight 35. Balancing weights 35 are employed to compensate for imbalances caused by structural asymmetry within the apparatus and for the added weight of transmitter 33. Circular waveguide loop 36 is spaced-apart from transmitter 34 and is coaxial with the axis of shaft 31. As illustrated herein, waveguide loop 36 is stationary while transmitter 34 is rotating with shaft 31. Coupler 37 is shown projecting from transmitter 34 into close proximity with waveguide loop 36. Coupler 38 also projects in close proximity with waveguide loop 36. As stated before, it is necessary that one of the couplers 37, 38 be a directional coupler in order for a constant amplitude signal to be received by receiver 39.

Figure 3:
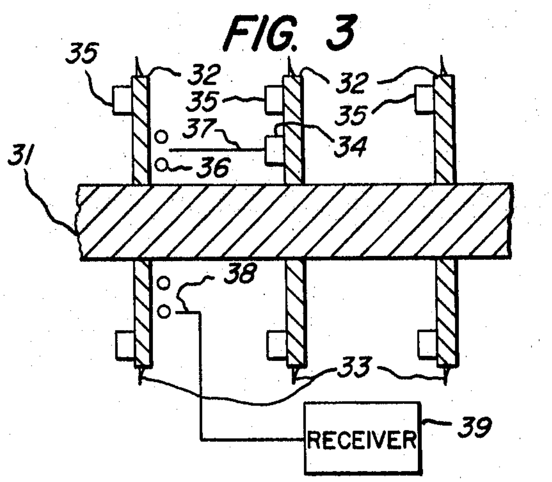
FIG. 3 is a simple cross-sectional view of one embodiment of my present invention illustrating a telemetry transmitter and a resonant ring attached to the rotating structure.

FIG. 3 illustrates an arrangement almost identical to that of FIG. 2 except that circular waveguide loop 36 is attached to one of the wheels 32. Thus, in this feature, waveguide loop 36 also rotates with transmitter 34. The arrangement illustrated herein is advantageous because of the symmetrical arrangement. That is, waveguide loop 36 being symmetrical does not cause an imbalance in the rotation of shaft 31 and thereby avoids the need of additional balancing weights 35.

Figure 4:
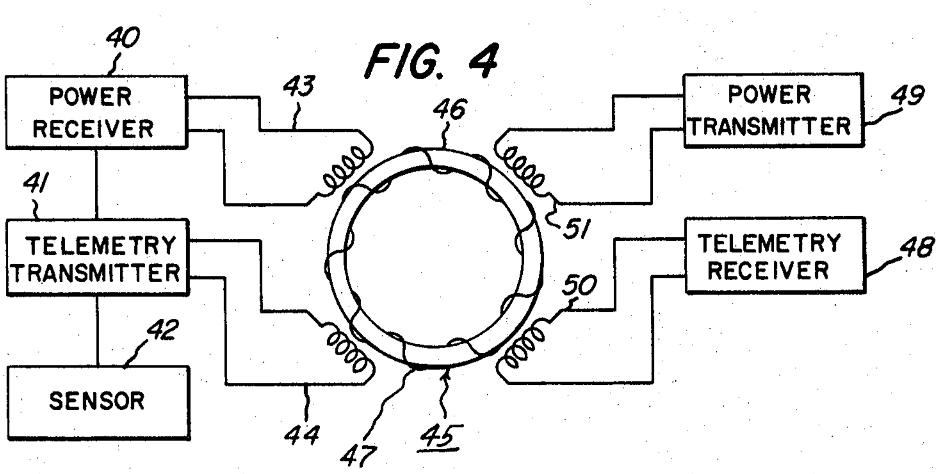
FIG. 4 is an electrical schematic of another embodiment of my present invention.

FIG. 4 illustrates in schematic form another embodiment of my present invention which eliminates the need of a power supply and utilizes a waveguide loop of reduced circumference. A power receiver 40 provides a power input into telemetry transmitter 41 for transmitting a signal received from sensor 42. Power receiver 40 and telemetry transmitter 41 are coupled respectively by directional couplers 43, 44 to helically wound waveguide loop 45. It may be desirable to supply the power necessary to energize and operate telemetry transmitter 41 externally of the rotating structure. Batteries are heavier, relatively short-lived, and may be difficult to operate at high temperatures. A power receiver capable of converting a signal into an appropriate DC supply readily adapts itself to this environment.

Waveguide loop 45 which is a helical waveguide comprises a nonconductive cylindrical ring 46 of material wound with a closed length of conducting wire 47. Helical waveguides are particularly useful when the available space is limited. As is well known, the propagation velocity of waves along a helix is less than the free space velocity and may be determined by the diameter and pitch of the helix. With appropriate values of helix diameter and pitch, the propagation velocity of electromagnetic waves moving therein may be made an order of magnitude less than the free space velocity. Since the wavelength along the helix is proportional to the velocity of propagation, similar reductions in wavelength are obtained. For example, when the operating frequency is about 100 MHz, the circumference of the ring may be reduced from 3 meters, as in the case of the two wire waveguide, to approximately 1 meter or less when employing a helical waveguide loop.

Closely associated with telemetry signal receiver 48 is power transmitter 49. Couplers 50, 51 provide respectively the coupling of receiver 48 and power transmitter 49 to waveguide loop 45. As illustrated in FIG. 4, all couplers are directional; however, it is necessary for only two couplers be directional, one in the signal circuit and one in the power circuit. Alternatively, a single coupler attached to a diplexer may be employed in lieu of the pairs of couplings at each end of the circuits. As before, however, one of the couplers attached to the diplexers must be directional. The frequency of the power transmission may be set conveniently at approximately 10 MHz, thus allowing resonance to take place within waveguide loop 45 for the power signal also.

In summary, it may be seen that the objects set forth have been supplied by the structure as described. Thus, in the operation of the embodiment of FIG. 1, a signal in some proportion to a phenomenon (vibrations, for example) originating within a rotating structure is generated by a sensor 11, is amplified, modulated onto a carrier, and transmitted by transmitter 13, and is coupled into waveguide 16 by directional coupler 15. Waveguide 16 may be either stationary with respect to coupler 17 (FIG. 2) or stationary with respect to coupler 15 (FIG. 3). The resulting induced wave circulating in one direction within waveguide loop 16 as determined by the selected parameters of directional coupler 15 is reinforced by the resonating waveguide 16. This is accomplished by choosing the circumference of waveguide 16 to be an integer multiple of the wavelength of the operating frequency of transmitter 13. Coupler 17 couples the signal out of the waveguide 16 where the signal proceeds to receiver 19. The magnitude of the phenomenon may be determined through measurements of the received signal.

All of the above is accomplished independent of the movement of the rotating structure and also without the need of slip rings, contacting brushes, and the like. Because the fields are advantageously confined to the waveguides, the apparatus of my present invention is substantially unaffected by reflecting or conducting material in the region of the transmitter and receiver. Finally, due to the resonant properties of the waveguide loop, nearly complete power transfer between the input and output couplers and the waveguide loop may be effectuated.

While only certain preferred features and embodiments of the apparatus of my present invention have been described and illustrated, many modifications will occur to those skilled in the art. It is, therefore, to be understood that the appended claims are intended to cover all such modifications and changes as fall within the true spirit and scope of the invention.

I claim:

1. Apparatus for transmitting a signal within a rotating body comprising:
- means for transmitting a signal of a predetermined frequency;
- means for receiving the signal transmitted by said transmitting means, said transmitting means and said receiving means moving relative with respect to each other;
- a waveguide loop having a circumference approximately an integer multiple of the wavelength of the signal;
- first coupling means spaced apart from said waveguide loop coupling the signal from said transmitting means to said waveguide loop causing a wave to circulate around said waveguide loop;
- second coupling means spaced-apart from said waveguide loop and coupling the signal from said waveguide loop to said receiving means;
- wherein one of said first and second coupling means is a directional coupler.

2. Apparatus of claim 1 in which said transmitting means and said first coupling means are secured to a high-speed rotating body, said first coupling means moving in a circle having a circumference approximately the same as said waveguide loop, and said second coupling means is stationary with respect to said receiving means.

3. The apparatus of claim 1 in which both of said first and second coupling means are directional couplers.

4. Apparatus of claim 1 in which said waveguide loop further comprises a helical line waveguide.

5. Apparatus of claim 1 in which said circular waveguide is stationary with respect to said second coupling means.

6. Apparatus of claim 1 in which said circular waveguide is stationary with respect to said first coupling means.

7. Apparatus of claim 1 in which said first coupling means is a loop coupler and said second coupling means is a directional coupler.

8. Apparatus of claim 1 including a power transmitter coupled to said waveguide loop, a power receiver mounted on the rotating body and coupled to said waveguide loop, said power receiver receiving a signal from said power transmitter and in response thereto supplying power to energize and operate said transmitting means.